(12) United States Patent
Vogelaar et al.

(10) Patent No.: US 9,410,657 B2
(45) Date of Patent: Aug. 9, 2016

(54) ADJUSTABLE CHOCK

(71) Applicants: Dick Vogelaar, Zwijndrecht (NL);
Marco Westerman, Zoetermeer (NL)

(72) Inventors: Dick Vogelaar, Zwijndrecht (NL);
Marco Westerman, Zoetermeer (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/407,069

(22) PCT Filed: Jun. 4, 2013

(86) PCT No.: PCT/EP2013/061493
§ 371 (c)(1),
(2) Date: Dec. 11, 2014

(87) PCT Pub. No.: WO2013/186088
PCT Pub. Date: Dec. 19, 2013

(65) Prior Publication Data
US 2015/0345692 A1    Dec. 3, 2015

(30) Foreign Application Priority Data

Jun. 11, 2012   (WO) ................. PCT/EP2012/060991

(51) Int. Cl.
*F16M 7/00*        (2006.01)
*F16B 5/02*        (2006.01)
(Continued)

(52) U.S. Cl.
CPC . *F16M 7/00* (2013.01); *F16M 5/00* (2013.01); *F16M 11/04* (2013.01); *B23Q 1/0054* (2013.01); *F16B 5/0225* (2013.01); *F16B 5/0233* (2013.01)

(58) Field of Classification Search
CPC ............ F16M 7/00; F16M 5/00; F16M 11/04; B23Q 1/0054; F16B 5/0225; F16B 5/0233
USPC ............................ 248/651, 677, 188.2; 92/15
See application file for complete search history.

(56) References Cited

U.S. PATENT DOCUMENTS

| | | | | |
|---|---|---|---|---|
| 1,380,347 A | * | 6/1921 | Blume ................. | F16B 5/0216 248/188.1 |
| 3,361,410 A | * | 1/1968 | Messer .................... | F16M 7/00 248/188.4 |
| 3,791,703 A | * | 2/1974 | Ifield ..................... | F01B 3/0073 384/117 |

(Continued)

FOREIGN PATENT DOCUMENTS

| | | |
|---|---|---|
| DE | 2203381 A1 | 8/1973 |
| EP | 0316283 A1 | 5/1989 |

(Continued)

*Primary Examiner* — Anita M King
(74) *Attorney, Agent, or Firm* — Bryan Peckjian; SKF USA Inc. Patent Dept.

(57) ABSTRACT

An adjustable chock for levelling and anchoring a machine to a foundation. The chock comprises a base element, a center element and a spherical washer, each is rotationally symmetric about a center axis. The center element is axially translational relative to the base element. The base element or the center element includes a mating surface for receiving the spherical washer. The chock has a center through hole for receiving an anchor bolt. The base element comprises an hydraulic connection point and a channel for hydraulic fluid. The channel is in connection with a chamber enclosed between surfaces of the center element and the base element, wherein in use, filling the chamber with hydraulic fluid exerts an axial pressure on the center element, causing an axial translation of the center element relative to the base element.

6 Claims, 2 Drawing Sheets

(51) Int. Cl.
*F16M 11/04* (2006.01)
*B23Q 1/00* (2006.01)
*F16M 5/00* (2006.01)

(56) References Cited

U.S. PATENT DOCUMENTS

| | | | | |
|---|---|---|---|---|
| 7,343,846 B2 * | 3/2008 | Stanford | ................... | B66F 3/30 92/18 |
| 7,819,375 B1 * | 10/2010 | Johansen | ................. | F16M 7/00 248/188.2 |
| 2006/0260462 A1 * | 11/2006 | Stanford | ................... | B66F 3/30 92/15 |
| 2010/0051763 A1 * | 3/2010 | Knight, III | ........... | B23Q 1/0054 248/161 |
| 2014/0166845 A1 * | 6/2014 | Hooghart | ................. | F16M 7/00 248/670 |

FOREIGN PATENT DOCUMENTS

| | | |
|---|---|---|
| GB | 1343518 A | 1/1974 |
| WO | 2004081377 A2 | 9/2004 |

* cited by examiner

ADJUSTABLE CHOCK

CROSS REFERENCE TO RELATED APPLICATIONS

This is a National Stage Application claiming the benefit of International Application Number PCT/EP2013/061493 filed on 4 Jun. 2013, which claims the benefit of European Patent Application Serial Number PCT/EP2012/060991 filed on 11 Jun. 2012, both of which are incorporated herein by reference in their entireties.

FIELD OF THE INVENTION

The present invention relates to a height-adjustable chock for anchoring and levelling a heavy machine on a foundation.

BACKGROUND TO THE INVENTION

An example of such a device is disclosed in EP 0316283. The device comprises an annular base element having an internal thread, which receives a center element, part of which is provided with an external thread. The height of the device is therefore adjustable by screwing the center element relative to the base element. The center element has a concave top surface, which supports a washer with a convex bottom surface. In use of the device, part of a heavy machine rests on the washer, whereby angular misalignments are accommodated via the convex and concave mating surfaces of the device. Furthermore, the washer and the center element comprise a through hole, so that when the device has been adjusted to the required height, the machine part can be bolted to the foundation.

There is still room for improvement.

SUMMARY OF THE INVENTION

The present invention resides in an adjustable chock for levelling and anchoring a machine to a foundation. The chock comprises a base element, a center element and a spherical washer, each of which is rotationally symmetric about a center axis, whereby the center element is axially translational relative to the base element; the spherical washer comprises a surface which is one of concave or convex; the base element or the center element comprises a mating surface for receiving the spherical washer, where the mating surface is the other of concave or convex. The chock further has a center through hole for receiving an anchor bolt. According to the invention, the base element comprises an hydraulic connection point and a channel for a hydraulic fluid. The channel is in connection with a chamber enclosed between surfaces of the center element and of the base element such that in use of the chock, filling the chamber with hydraulic fluid causes an axial translation of the center element relative to the base element.

In a further development of the invention, the chock comprises a mechanical stop for limiting the axial translation of the center element relative to the base element and for setting a maximum adjustment height of the chock.

A chock according to the invention therefore provides a safe and reliable means for the support, height adjustment and anchoring of a heavy machine part. Other advantages of the present invention will become evident from the detailed description and drawings.

DESCRIPTION OF THE FIGURES

The invention will be described with reference to the attached drawings in which.

DETAILED DESCRIPTION

Figure 1A:
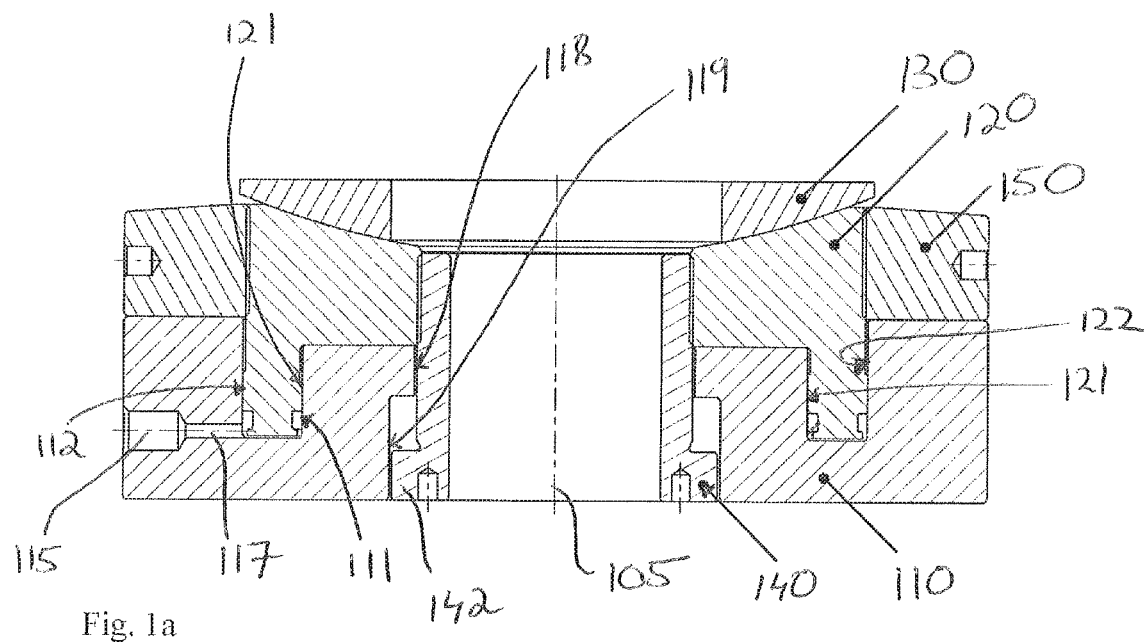
FIG. 1a shows a cross-sectional view of a first embodiment of a chock according to the invention, in a first position.
Figure 1B:
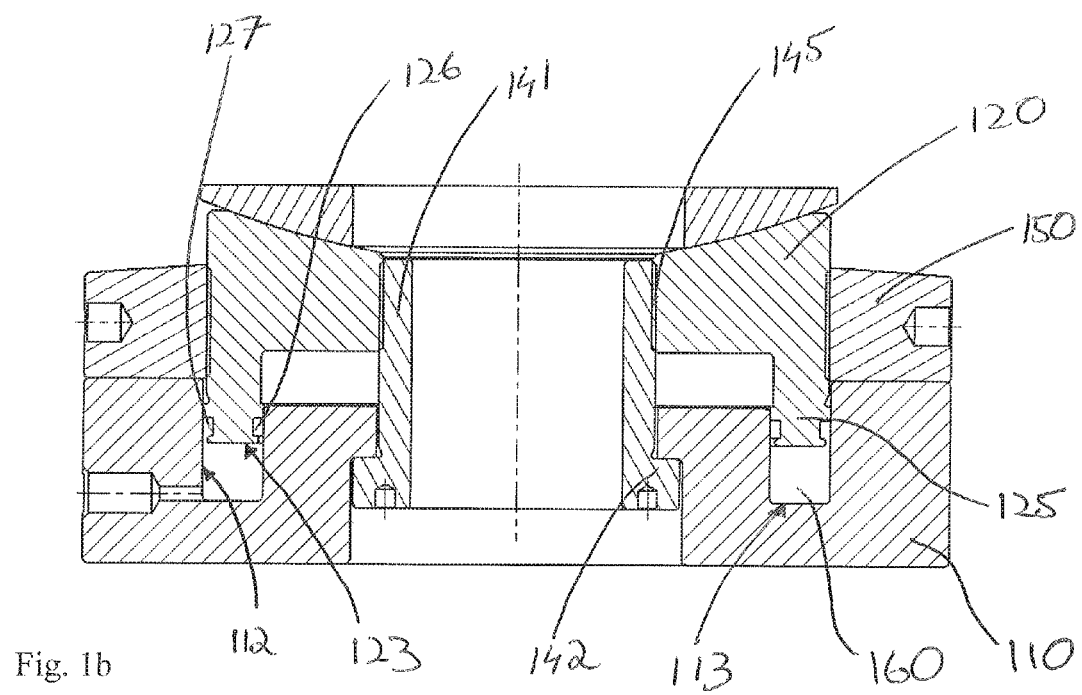
FIG. 1b shows a cross-sectional view of the chock of FIG. 1a, in a second position.

A first embodiment of the inventive chock is depicted in FIGS. 1a and 1b. In FIG. 1a the chock is depicted at its lowest height level; in FIG. 1b, the chock is shown at a maximum height adjustment level. The chock is intended for use in combination with several other chocks for supporting and anchoring a heavy piece of machinery, such as a main propulsion engine on board a marine vessel. In such applications, it is vital the engine is as level as possible, to ensure proper alignment with the vessel's propeller shaft. Once level, the engine must then be firmly secured to a foundation.

The chock comprises a base element 110, a center element 120 and a spherical washer 130, each of which has rotational symmetry with respect to a center axis 105 of the chock. In this embodiment, the spherical washer 130 has a lower surface that is convex in shape, which rests on an upper mating surface of the center element 120, which mating surface is concave in shape. The concave/convex mating surfaces accommodate up to approximately 4 degrees of angular difference between e.g. the engine bed and the foundation. To ensure that the mounting plane of the engine is perfectly level, each chock is preferably adjustable in height. The center element 120 is therefore axially translational relative to the base element 110 along the axis 105.

In conventional chocks, the center element has a threaded connection with the base element, and height is adjusted by screwing the center element using a manual tool. Depending on the magnitude of the load which the chock must support, manual adjustment may be very difficult.

In a chock according to the invention, the center element 120 is adjusted in height relative to the base element 110 via hydraulic means. The center element is arranged on top of the base element, and fits into the base element. The center element 120 and the base element 110 are shaped such that a first axial sliding interface is formed between a first cylindrical surface 111 of the base element and an overlapping first cylindrical surface 121 of the center element. A second axial sliding interface is formed between a second cylindrical surface 112 of the base element and an overlapping second cylindrical surface 122 of the center element. The first cylindrical surfaces 111, 121 of the first sliding interface have a smaller diameter than the second cylindrical surfaces 112, 122 of the second sliding interface. Consequently, the base element has a transitional surface 113 between its first and second sliding surfaces 111, 112, and the center element 120 comprises a transitional surface 123 between its first and second cylindrical surfaces 121, 122. Suitably, a first seal (not shown) is provided between the first cylindrical surfaces 111, 121 of the base element 110 and of the center element 120, and a second seal (not shown) is provided between the second cylindrical surfaces 112, 122 of the base element 110 and of the center element 120. Thus, a sealed chamber 160 is defined between the transitional surface 113 of the base element, the transitional surface 123 of the center element and the first and second sliding interfaces.

The base element 110 is further provided with a hydraulic connection point 115 at its outermost cylindrical surface. In addition, the base element has a channel 117 for hydraulic fluid, which channel is in connection with the chamber 160. Thus, when hydraulic fluid is pumped into the chamber 160, a pressure is exerted on the transitional surface 123 of the center element, causing it to be raised, as shown in FIG. 1b.

In the depicted embodiment, the first and second cylindrical surfaces of the base element are respectively formed by an inner side wall 111 and an outer side wall 112 of an annular recess. Correspondingly, the first and second cylindrical surfaces of the center element are formed by an inner side wall 121 and an outer side wall 122 of an annular protrusion 125 that fits into the annular recess. Suitably, the inner side wall of the protrusion 125 has a first groove 126 for receiving the first hydraulic seal (not shown). Similarly, the outer side wall of the protrusion 125 has a second groove 127 for receiving a second hydraulic seal (not shown).

To prevent the center element from flying off, in the event that excessive hydraulic pressure is applied, the chock is provided with a mechanical height limiter. In this embodiment, the height limiter 140 is formed by a bushing, which is arranged within a bore of the center element 120 and within a bore of the base element 110. The bushing has first section 141 and a second section 142, whereby the second section 142 has a larger external diameter than the first section. At an upper end of the first section 141, the height limiter is coupled to the bore of the center element 120 by means of a threaded connection 145 or other suitable form of connection. Thus, when hydraulic pressure builds up in the chamber 160, both the center element 120 and the height limiter 140 move upwards relative to the base element 110. The bore of the base element 110 has an upper portion 118 and a lower portion 119. The upper portion has an internal diameter that matches the external diameter of the first section 141 of the height limiter, and the lower portion 119 has an internal diameter that matches the external diameter of the second section 142 of the height limiter 140. The maximum adjustment height of the chock 100 is therefore reached when the second section 142 of the height limiter 140 hits the upper portion 118 of the base element bore. Safety is thereby ensured. The height limiter 140 is axially moveable with respect to the center element 120 so that a maximum volume of the chamber can be adjusted, thereby allowing a maximum distance the center element 120 may be raised by hydraulic pressure to be modified.

When the center element has been adjusted to the desired height, it can be secured at this height. In the depicted embodiment, the chock further comprises a locknut 150. Suitably, an outermost cylindrical surface of the center element 120 is provided with an external thread that engages with an internal thread of the locknut. The locknut therefore moves with the center element when hydraulic fluid is pumped into the chamber 160. Preferably, the external thread on the center element extends along a greater axial distance than the internal thread of the nut. When the desired height has been reached, the locknut 150 can therefore be screwed downwards until a bottom surface of the locknut hits a top surface of the base element, as shown in FIG. 1b. The hydraulic pressure can then be removed, and the locknut 150 takes over the forces from the supported load.

Finally, an anchor bolt is inserted through a central opening in the spherical washer 130 and through a bore of the height limiter 140.

Figures 2, 3, 4:
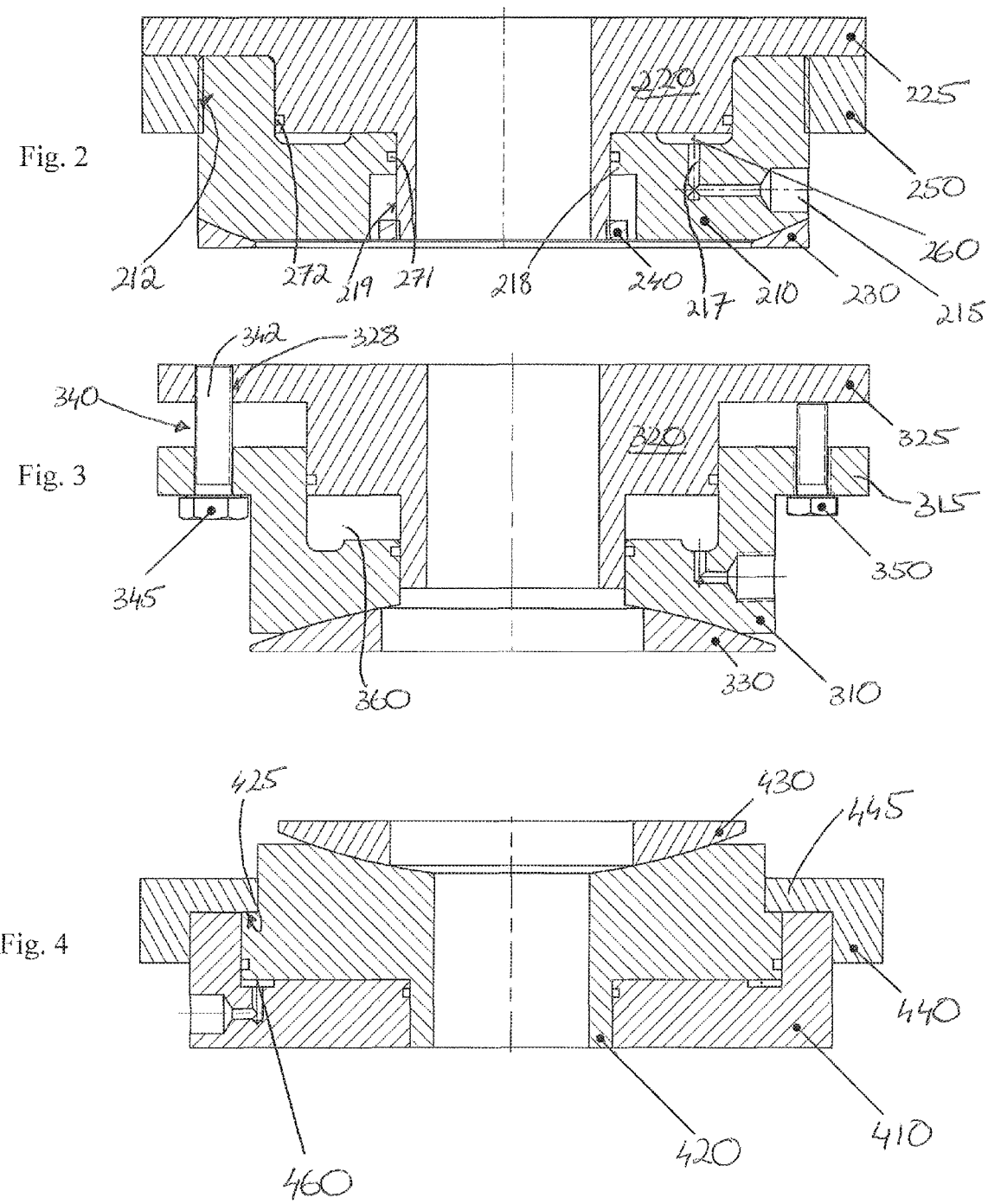
FIGS. 2-4 respectively show cross-sectional views of a second, a third and a fourth embodiment of a chock according to the invention.

Several designs are possible within the scope of the current invention. For example, a second embodiment of an inventive chock is depicted in FIG. 2. The chock comprises a base element 210, a center element 220 and a spherical washer 230. The spherical washer 230 has a concave upper surface in this embodiment, and the base element 220 rests on the washer and is provided with a convex mating surface. The center element has a top plate 225 for supporting the load.

The chock again comprises a first axial sliding interface between opposing cylindrical surfaces of the base element 210 and the center element 220. A first seal 271, such as an o-ring, is provided at the first interface. The chock further comprises a second axial sliding interface between opposing cylindrical surfaces of the base element 210 and the center element 220. A second seal 272 is provided at the second interface. A chamber 260 for hydraulic fluid is thus defined by the first and second sliding interfaces and lower and upper surfaces of the center element 230 and base element 210 respectively. The chamber 260 is connected to hydraulic connection point 215 on the outermost cylindrical surface of the base element via a channel 217.

In this embodiment, the bore of the center element 220 extends over the full axial height of the chock, and serves as the opening for receiving the anchor bolt. At a lowermost portion of the center element 220, a nut 240 is coupled to the center element. The base element 210 again has a bore with a large diameter section 219 and a small diameter section 218, above the large-diameter section. The nut 240 therefore serves as the mechanical height limiter, which prevents the center element 220 from being raised further when the nut 240 hits the small-diameter section 218 of the base element bore.

The chock of the second embodiment is also provided with a locknut for securing the chock at a desired height level. In this embodiment, an outermost cylindrical surface of the base element 210 is provided with an external thread 212, which engages the internal thread of the locknut 250. When the center element 220 has been set to the desired height, by pumping hydraulic fluid into the chamber 260, the chock is secured at this height by screwing the locknut 250 upwards until it hits an underside of the top plate 225 of the center element.

A third embodiment of a chock according to the invention is depicted in FIG. 3. As before, the chock comprises a chamber 360 enclosed by first and second axial sliding interfaces between opposing first and second cylindrical surfaces of the base element 310 and the center element 320. The spherical washer 330 has a convex upper surface on which a concave mating surface of the base element is received. The center element 320 has a top plate 225 for supporting the load.

In this embodiment, the adjustment height of the chock is limited by at least one first bolt 340 and the chock is secured at the desired height by at least one second bolt 350. The top plate comprises at least one threaded hole for receiving the at least one first bolt 340, such that an end of the bolt shank 342 is connected to the center element 320. The base element 310 comprises a flange part 315, which comprises a though hole that is arranged axially opposite from the threaded hole 328 in the top plate 325 of the center element. The bolt shank 342 of the first bolt 340 is inserted through the flange hole and can slide axially within this through hole, as the height of the center element relative to the base element changes. A maximum height adjustment level is reached when the bolt head 345 hits an underside of the flange 315 of the base element, as depicted in FIG. 3. Preferably, the height limitation means comprises a plurality of first bolts 340.

For locking the center element at the desired height level, the flange part 315 of the base element 310 comprises a threaded through hole for the at least one second bolt 350. Preferably, a plurality of second bolts and corresponding threaded through holes are provided. When the desired height level is reached, each second bolt is screwed upwards until a base of the bolt shank makes contact with an underside of the top plate 325. Thus, the plurality of second bolts 350 take over the forces from the supported load and the hydraulic pressure can be removed. The chock is then anchored to the foundation using an anchor bolt.

It is also possible to lock the center element at the desired height hydraulically, by using a pressure greater than the pressure needed for height adjustment and which is sufficient to withstand the forces from the anchor bolt.

FIG. 4 shows an example of a fourth embodiment of a chock according to the invention, which is provided only with mechanical height limitation 440 and not with mechanical locking means. The height limiter is formed by a stop plate 440. The stop plate has a cylindrical inner surface, provided with an internal thread, which engages with an external thread on an outermost cylindrical surface of the base element 410. The stop plate has a flange part 415, perpendicular to the cylindrical surface of the stop plate, which overlap an axially oriented top surface 425 of the center element 420. In the depicted embodiment, the stop plate is screwed upwards to a maximum permissible height, before hydraulic fluid is pumped into the chock's hydraulic fluid chamber 460. In a further example, the stop plate has a greater axial length, whereby an underside of the flange part 445 is arranged above the axially oriented top surface 425 of the center element. It may then be unnecessary for further adjustment of the stop plate 440. In this embodiment, the spherical washer 430 has a lower surface that is convex in shape, which rests on an upper mating surface of the center element 420.

A number of aspects/embodiments of the invention have been described. It is to be understood that each aspect/embodiment may be combined with any other aspect/embodiment. Moreover the invention is not restricted to the described embodiments, but may be varied within the scope of the accompanying patent claims.

The invention claimed is:

1. An adjustable chock for levelling and anchoring a machine to a foundation, the chock comprising:
a base element, a center element and a spherical washer, each of which is rotationally symmetric about an axis, whereby:

the center element is axially translational relative to the base element;

the spherical washer comprises a surface which is one of concave or convex;

one of the base element or the center element comprises a mating surface for receiving the spherical washer, the mating surface the other of concave or convex; and the chock has a center through hole for receiving an anchor bolt;

wherein the base element comprises an hydraulic connection point and a channel for a hydraulic fluid; and the channel is in connection with a chamber defined between surfaces of the center element and the base element such that in use of the chock, filling the chamber with hydraulic fluid causes an axial translation of the center element relative to the base element, the chamber being annular in shape about a central portion of the adjustable chock, wherein the adjustable chock is configured such that a maximum volume of the chamber can be adjusted.

2. The adjustable chock of claim 1, wherein the axial translation of the center element relative to the base element is limited by a mechanical stop, wherein the mechanical stop is displaceable in an axial direction with respect to the center element such that a maximum distance that the center element can axially translate relative to the base element can be adjusted.

3. The adjustable chock of claim 2, wherein the chock further comprises a locking feature for securing the center element at a desired level.

4. The adjustable chock of claim 1, wherein the chock further comprises locking means for securing the center element at a desired level.

5. The adjustable chock of claim 1, wherein the chamber is annular about a bushing such that a minimum distance from the chamber to the axis is greater than a maximum distance from the bushing to the axis, the bushing being connected to a center element surface by a first bushing portion.

6. The adjustable chock of claim 5, wherein the bushing comprises a second bushing portion that has a greater external diameter than the first bushing portion and is configured to engage a base element surface to limit the maximum volume of the chamber.

* * * * *